June 28, 1955 C. S. BATCHELOR ET AL 2,711,775
METHOD AND APPARATUS FOR DEBONDING OF BRAKE LININGS
Filed June 27, 1951 2 Sheets-Sheet 1
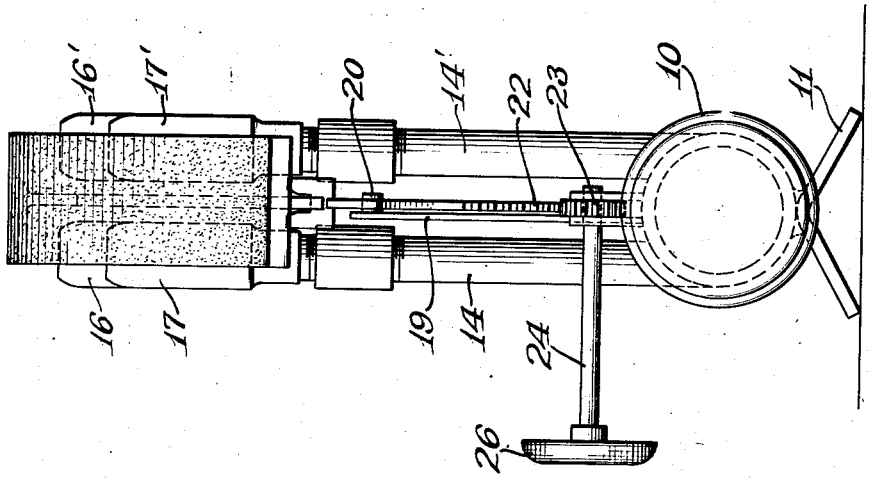
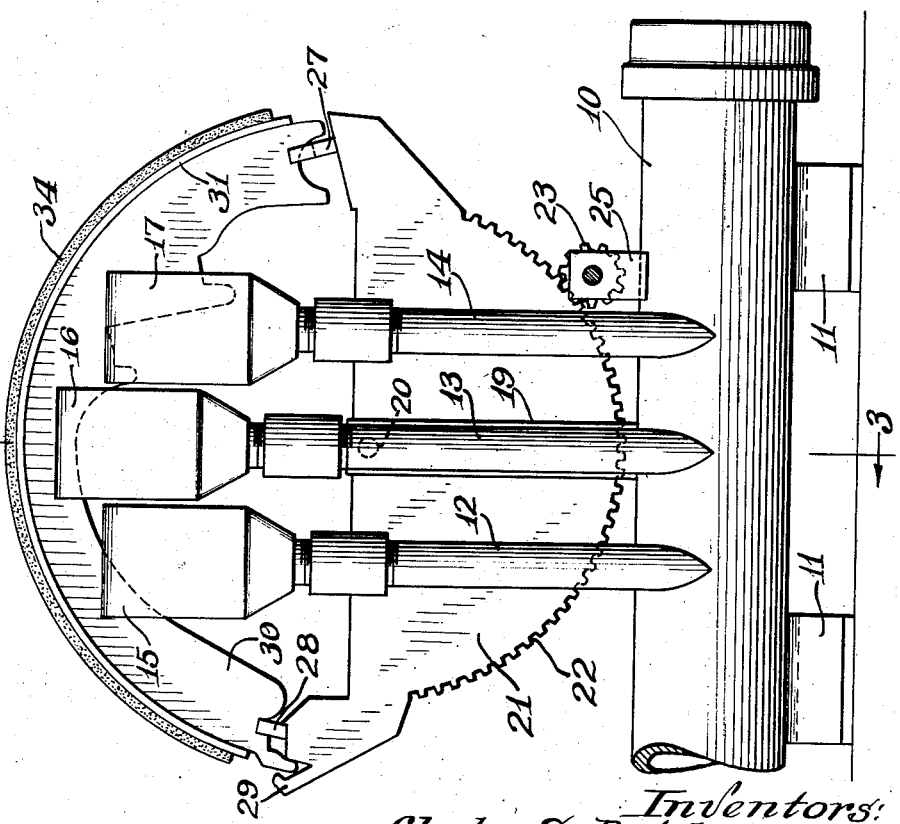
Inventors:
Clyde S. Batchelor
Rudolph E. Steck
By Gary, Desmond & Parker Attys.

June 28, 1955  C. S. BATCHELOR ET AL  2,711,775
METHOD AND APPARATUS FOR DEBONDING OF BRAKE LININGS
Filed June 27, 1951  2 Sheets-Sheet 2
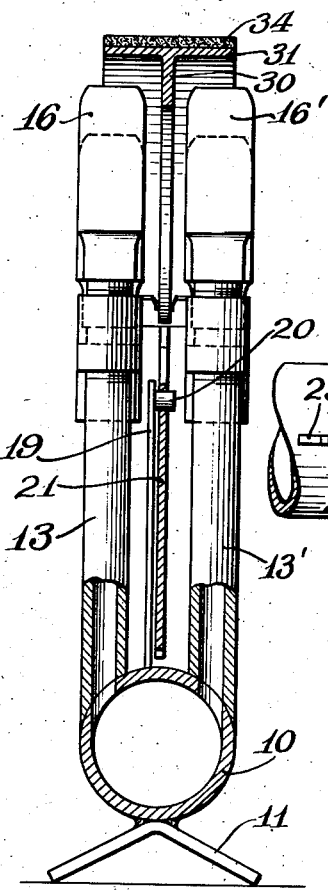
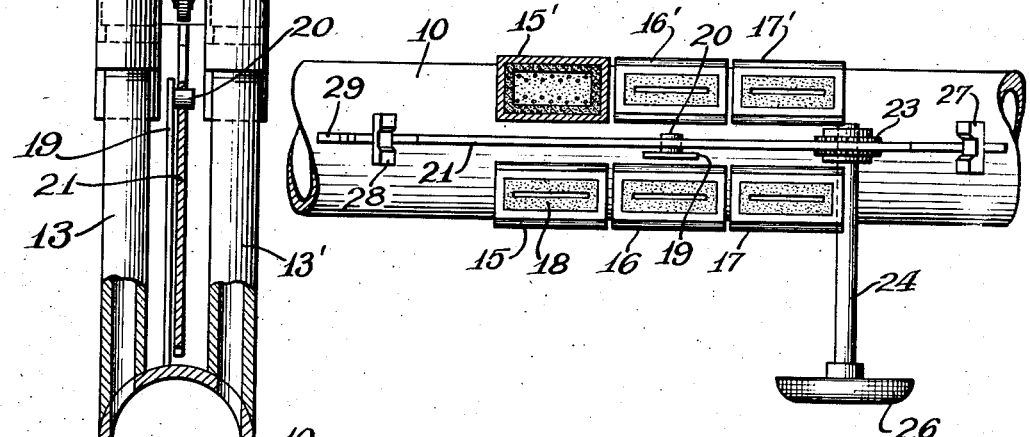
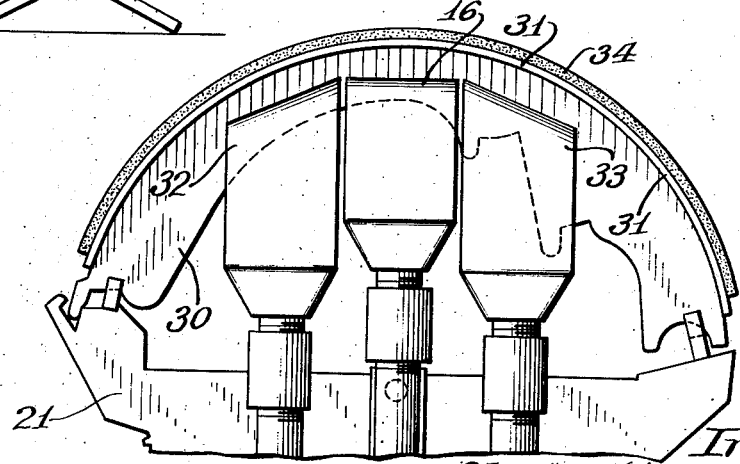
Inventors:
Clyde S. Batchelor
Rudolph E. Steck
By Gary, Desmond & Parker Attys.

United States Patent Office 2,711,775
Patented June 28, 1955

2,711,775

METHOD AND APPARATUS FOR DEBONDING OF BRAKE LININGS

Clyde S. Batchelor, Upper Stepney, and Rudolph E. Steck, Stratford, Conn., assignors to Raybestos-Manhattan, Inc., Passaic, N. J., a corporation of New Jersey Application June 27, 1951, Serial No. 233,756

5 Claims. (Cl. 154—1)

This invention relates to the debonding or removal of brake linings from brake shoes to which they have been bonded or adhesively united, and to a novel method and means for accomplishing same.

At the present time it is common practice to adhesively unite or bond brake linings to brake shoes by means of a heat-hardenable organic binder, instead of joining the two by means of rivets. The present invention is concerned with the removal and clean separation of bonded brake linings from brake shoes in a rapid and economical manner when it is desired or necessary to replace the linings.

The bonding adhesives generally employed are thermosetting synthetic resins such as the thermosetting phenolic resins and specifically phenol formaldehyde. Other examples are urea and melamine formaldehyde. These may be employed alone or in combination with vulcanizable rubbers, either natural or synthetic to give a firm tough bond. Further these adhesives may be applied by directly coating the lining or shoe, or by interposition of tie-plys comprised of a fibrous matrix or network impregnated with the binder in a heat-curable condition. Since it is the object of adhesive bonding to firmly unite the lining to the metallic brake shoe so that the two will remain secured under severe conditions of service, separation of the two when desired has raised novel problems, particularly those of efficiency and economy. For example, in order to make replacement of lining while retaining the same brake shoe feasible, the lining should be able to be separated cleanly so as to leave the shoe with a clean smooth surface and not require any, or any appreciable amount of grinding. Further one should be able to effect the operation quickly and by economical means.

Various methods for debonding have been proposed, although the most effective are those employing heat to destructively distill and break down the binder so that the lining may be separated from the shoe. However, even in such respect, the various prior practices or means employed to effect same have various drawbacks. For example, one proposal has been to heat by strapping electric heating coils over the shoe. However, this operation takes approximately five minutes and causes considerable smoke and mess. Another method is to employ ultra-high frequency induction heating. While this is rapid and effective, the equipment is very expensive. Another proposal has been the employment of conventional gas burners to heat the shoe. However, such gas burners have a relatively low heat output, take a long time and complicate the problem by producing undesirable results. Thus, although prolonged heating with a conventional gas burner will effect destructive distillation of the organic binder, it releases generated gases slowly and without blistering the cement line and produces an undesirable phenomenon in that the cement line is gradually strengthened by a process similar to coking. Further a brake shoe that has been slowly stripped of brake lining in such manner remains coated with a coke film that must be mechanically removed, such as by grinding, before the shoe can be reused. It has also been proposed to employ heating by means of a convection furnace. This, however, is too slow in that it takes up to about one-half hour and also has the undesirable effect of inducing coking with the undesirable effects aforementioned.

As distinguished from the foregoing, the present invention is characterized by the employment of radiant type gas heaters which provide rapidly penetrating heat so as to quickly bring about destructive distillation of the binder. The gases and other volatiles thus quickly generated form blisters at and within the cement line during the brief period when the binder of the cement is decomposing and reverts to a plastic nature, to result in a "blasting off" effect of the lining from the shoe providing freedom from undesirable coking and leaving a relatively clean shoe. The present invention is further characterized by a novel means and arrangement of apparatus for effecting the operation.

The foregoing, and other objects and advantages will be apparent from a consideration of the following specification and accompanying drawings, wherein:

Fig. 1 is a side elevational view of a device for effecting the debonding of a bonded brake lining from a brake shoe, in accordance with the present invention, and Fig. 2 is an end elevational view thereof.

Fig. 3 is a section on the line 3—3 of Fig. 1.

Fig. 4 is a top plan view of the device of Fig. 1, with the supported brake shoe removed, and with one of the burners or radiators in section.

Fig. 5 is a fragmentary side elevational view of a modified arrangement of the device of Fig. 1.

Referring to the drawings, the reference numeral 10 indicates a gas manifold which may be suitably supported as by means of the legs 11. Extending from the manifold 10 are a plurality of conduits in two spaced groups, one comprising the conduits 12, 13 and 14 and the other 12', 13' and 14', all of which here extend vertically. These conduits are provided with, and terminate at their upper ends in the respective burners or radiators 15, 16 and 17, and 15', 16' and 17'. The gas manifold 10 is fed by a mixing machine (not shown) wherein atmospheric air and a combustible gas are mixed in proportions designed to impart maximum combustion efficiency.

These burners are radiant-type gas heaters of conventional construction, such as those sold by Selas Corporation of America, and others, and have a number of gas jets producing a flame which heats especially formed refractory or fire clay elements held in it. As a result of excellent combustion obtained, the fire clay is heated to incandescence, and emits, radiantly, a great deal of heat energy. Of course, the products of combustion rising from the heater may deliver a considerable amount of heat by convection, but such heaters are essentially radiators. Thus, premixed gas and air are supplied under pressure, through means not shown, to the manifold 10 and to the burners through their respective conduits where the combustible gas-air mixture burns down inside the burner from numerous ports in the enclosed refractory structure. Here combustion proceeds in contact with the surface of the refractory lining which attains white-hot incandescence and temperatures as high as 3100° F., and intense radiation plays from wall to wall across the travel of the gases during their interaction so that the rate of combination of gas and air is accelerated, and as is well known, the rate of radiation increases with the temperature. The resulting superheated blast issues from the elongated slots at the top of the burners such as slot 18 indicated in burner 15, and is directed to the work at close range, as will be hereinafter more fully described.

Supported by and projecting vertically from the manifold 10, and disposed medially of the two rows of burners, is the spring clip fulcrum 19 provided with a pivot pin 20, which in turn rotatably supports a jig generally indicated at 21. This jig is of generally semi-circular form and is provided with gear teeth 22 at its arcuate portion. These gear teeth mesh with those of pinion 23 connected to shaft 24 journaled in the support 25 mounted on the manifold 10, and is actuated by the handle 26, so that the jig 21 may be swung through an arc. The corner portions of the jig 21 are provided with means for seating and supporting a brake shoe. Thus, at one corner portion there is provided the forked seat 27 and at the other a similar forked seat 28 and a retaining pocket 29. These portions 27, 28 and 29 are adapted to receive the end portions of the web or rib 30 of a typical brake shoe and to retain it adequately during the operation and limited arc of rotation of the jig 21. When it is desired to change the brake shoe jig to fit a different size brake shoe, it is merely necessary to pull the spring clip fulcrum toward the handwheel to disengage it. The jig may then be slid out and a new one inserted.

It will thus be seen that the arrangement of the components of the apparatus is such that web 30 of the brake shoe extends between the two rows of burners with a row of burners projecting towards the underface of each half of the arcuate flange portions 31 of the brake shoe. It will also be understood that in order to obtain the greatest efficiency and maximum advantage of the heat energy radiated from the burners that the orifices of the burners should be positioned as close to the brake shoe flange portions as possible, and the issuing blast undiluted by secondary air.

When employing a plurality of rectangular burner heads, as in Fig. 1, they must of necessity extend to different heights due to the arcuate shape of the brake shoe. However, as shown in Fig. 5, the upper ends of the burner heads may be shaped and disposed so that a group may be arranged to project closer to, and more nearly conform to, the arc of the brake shoe. Thus, in Fig. 5, all components are the same as in Fig. 1, except that the end burner heads 32 and 33 are formed with oppositely inclined upper ends and the blasts issuing from them will be normal to their inclination. It will also be understood that in the arrangement of Fig. 5 a second group of similar burners are positioned on the opposite side of the brake shoe web 30.

In the operation of the device of the present invention, the jig 21 is first turned by means of the handwheel 26 so that one end portion of the brake shoe and its supported lining 34, for example the end adjacent fork 27, is over one of the end burners, for example burner 17, and is held there for about 20 seconds to get up to desired temperature and to initiate destructive distillation of the binder between the shoe and the lining and the simultaneous separation of the lining from the shoe without burning the lining. The handwheel is then turned at a substantially uniform rate so that the jig is rotated clockwise and until the opposed end portion of the brake shoe is over the burner 15, the time of rotation being also a total of about 20 seconds, and then the lining may be immediately lifted from the shoe in a clean separation, without more being required than the movement of a spatula in the hand of the operator, primarily for convenience. The temperature of the brake shoe, during this operation is from about 1000° to about 1800° F., and preferably controlled from about 1200° to about 1400° F. for most binders. The time-temperature cycle may be regulated by the variables of the equipment, such as distance of the burners to the work, rate of movement of the shoe past the burners, burner throttling, adjustment of air-gas ratio at the mixing machine, manipulation of the super-heated blast, and other conventional methods and controls.

The high heat output and rapid delivery thereof to the work at close range in a penetrating manner brings about a quick breakdown or destructive distillation of the organic binder causing formation of blisters of volatiles within the cement or binder line before appreciable heat has entered into the relatively non-heat conducting brake lining. This has the effect of "blasting off" the lining from the shoe commencing with the end which was permitted to temporarily dwell for the indicated first 20 seconds over the burners, which "blasting off" effect then proceeds to "chase" along to debond the remaining portion of the lining during the subsequent approximately 20 seconds or during the period when the jig is rotated to carry the remaining portion of the brake shoe over the burners. At this terminal point the operator merely lifts the shoe from the jig and separates the lining from the shoe by hand or with the aid of a parting knife with a minimum of effort.

It will be understood that various changes may be made in the details of the above described apparatus without departing from the spirit of the invention. Thus, for example, instead of employing a handwheel for turning the jig other or automatic means in a timed cycle or sequence may be employed.

We claim as our invention:

1. The method of debonding a brake lining from a brake shoe to which it has been adhesively bonded by means of an interposed heat-hardened organic binder, which comprises initially directing a fixed superheated blast from a radiant type gas heater against and in close proximity to a limited arcuate end portion of the underface of the brake shoe, and after a temporary dwell thereat moving said brake shoe in the direction of its arc over said fixed blast, to progressively heat the entire underface area to a temperature of from about 1000° F. to about 1800° F. to thereby destructively distill said binder in a progressive manner over the length of the shoe.

2. The method of debonding a brake lining from a brake shoe to which it has been adhesively bonded by means of an interposed layer of heat-hardened organic binder, which comprises directing a fixed superheated blast of limited area from a radiant-type gas heater against and in close proximity to the underface of one end portion of said brake shoe until the lining parts from the shoe thereat by explosive action of generated volatile products resulting from rapid destructive distillation, and then moving said brake shoe in the direction of its arc over said fixed blast to continue said destructive distillation and separation of lining in a progressive manner over the length of the shoe.

3. A device for debonding a brake lining from a brake shoe to which it has been adhesively united by means of an interposed layer of heat-hardened organic binder, comprising a pivotally mounted rotatable support including a pair of spaced seats adapted to receive the opposed ends of the rib of said brake shoe, fixedly positioned radiant-type gas heating means disposed to extend in close proximity to the underface of a supported brake shoe and in juxtaposition with a limited arcuate area thereof, and means for rotating said rotatable support to permit progressive heating of the remaining area of the underface of a supported brake shoe.

4. A device for debonding a brake lining from a brake shoe to which it has been adhesively united by means of an interposed layer of heat-hardened organic binder, which comprises a pivotally mounted rotatable support means for said brake shoe, a plurality of fixedly positioned radiant-type gas heating means having orifices disposed in close proximity to the underface of a supported brake shoe, and means to rotate said support whereby to move a supported brake shoe in the direction of its arc and over said heating means.

5. A device for debonding a brake lining from a brake shoe to which it has been adhesively united by means of an interposed layer of heat-hardened organic binder, by rapid destructive distillation of said binder, which comprises pivotally supported rotatable means adapted to seat and support an arcuate brake shoe carrying an adhesively bonded brake lining, radiant-type gas heating means fixedly positioned adjacent opposite sides of said rotatable support and formed with restricted elongated orifices adapted to be disposed longitudinally of and in close proximity to the underface of a supported brake shoe, and means in engagement with said rotatable support for moving said brake shoe in the direction of its arc relative to said heating means.

References Cited in the file of this patent

UNITED STATES PATENTS

| Number | Name | Date |
|---|---|---|
| 471,802 | Parkinson | Mar. 29, 1892 |
| 1,283,941 | Smith | Nov. 15, 1918 |
| 1,834,781 | Inman et al. | Dec. 1, 1931 |
| 2,291,862 | Bailey | Aug. 4, 1942 |
| 2,432,868 | Earl et al. | Dec. 16, 1947 |
| 2,435,923 | Hess | Feb. 10, 1948 |
| 2,478,405 | Kuzmick | Aug. 9, 1949 |
| 2,494,281 | Batchelor et al. | Jan. 10, 1950 |
| 2,515,300 | Haber et al. | July 18, 1950 |
| 2,575,514 | Furczyk | Nov. 20, 1951 |
| 2,583,161 | Urbano | Jan. 22, 1952 |
| 2,609,310 | Barrett | Sept. 2, 1952 |
| 2,646,836 | Barrett | July 28, 1953 |
| 2,655,974 | Heintz | Oct. 20, 1953 |